United States Patent
Maekawa (10) Patent No.: US 10,023,310 B2
(45) Date of Patent: Jul. 17, 2018

(54) UNMANNED FLYING OBJECT AND FLIGHT CONTROL METHOD THEREOF

(71) Applicant: Panasonic Intellectual Property Corporation of America, Torrance, CA (US)

(72) Inventor: Hajime Maekawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/352,000

(22) Filed: Nov. 15, 2016

(65) Prior Publication Data

US 2017/0153640 A1 Jun. 1, 2017

(30) Foreign Application Priority Data

Nov. 30, 2015 (JP) ................................. 2015-232676
Jul. 15, 2016 (JP) ................................. 2016-139983

(51) Int. Cl.
*B64C 39/02* (2006.01)
*G05D 1/00* (2006.01)

(52) U.S. Cl.
CPC ......... *B64C 39/024* (2013.01); *G05D 1/0033* (2013.01); *B64C 2201/141* (2013.01); *B64C 2201/146* (2013.01)

(58) Field of Classification Search
CPC ............ B64C 39/024; B64C 2201/141; B64C 2201/146; G05D 1/0033

USPC .............................................................. 701/3
See application file for complete search history.

(56) References Cited

U.S. PATENT DOCUMENTS

| | | | | |
|---|---|---|---|---|
| 8,515,593 B2 * | 8/2013 | Marty | .................. | G05D 1/0022 701/11 |
| 2015/0298799 A1 * | 10/2015 | Bertrand | ................ | A63H 27/12 701/23 |
| 2016/0070265 A1 * | 3/2016 | Liu | ........................ | B64C 39/024 701/3 |
| 2016/0376004 A1 * | 12/2016 | Claridge | ................. | B64C 19/00 701/3 |

FOREIGN PATENT DOCUMENTS

JP     8-010451     1/1996

* cited by examiner

*Primary Examiner* — Tan Q Nguyen
(74) *Attorney, Agent, or Firm* — Greenblum & Bernstein, P.L.C.

(57) ABSTRACT

A flight control method of an unmanned flying object includes acquiring first positional information indicating a position of the unmanned flying object using a position sensor, receiving a position reset command and second positional information that indicates a position of an operation device from the operation device used to operate the unmanned flying object, determining a rotation angle needed to orient a movement direction of the unmanned flying object in a predetermined direction in accordance with the first positional information and the second positional information, and performing control to orient the movement direction of the unmanned flying object in the predetermined direction in accordance with the rotation angle.

15 Claims, 6 Drawing Sheets

UNMANNED FLYING OBJECT AND FLIGHT CONTROL METHOD THEREOF

BACKGROUND

1. Technical Field

The present disclosure relates to an unmanned flying object and a flight control method thereof and in particular, relates to a method of compulsorily setting the attitude of an unmanned flying object in a predetermined orientation in operating the unmanned flying object.

2. Description of the Related Art

There is a method of avoiding an unmanned flying object entering an uncontrolled state if a trouble occurs, such as a fall of an operator, in operating the unmanned flying object (see for example, Japanese Unexamined Patent Application Publication No. 8-10451). Japanese Unexamined Patent Application Publication No. 8-10451 discloses techniques of preventing a crash by causing a helicopter to hover if an operator encounters an accident, such as falling down, while operating the helicopter, which is an unmanned flying object.

The above-described conventional techniques, however, have an issue that it is difficult for an operator to determine the attitude of the hovering unmanned flying object in resuming the operation and thus, the operator cannot resume the operation of the unmanned flying object easily.

SUMMARY

One non-limiting and exemplary embodiment provides an unmanned flying object and a flight control method thereof, which enable an operator to easily resume the operation of the unmanned flying object.

In one general aspect, the techniques disclosed here feature an unmanned flying object including a position sensor that acquires first positional information indicating a position of the unmanned flying object, a wireless communicator that receives second positional information indicating a position of an operation device from the operation device used to operate the unmanned flying object, and circuitry that, in operation, when the wireless communicator receives a position reset command from the operation device, determines a rotation angle needed to orient a movement direction of the unmanned flying object in a predetermined direction in accordance with the first positional information and the second positional information; and performs control to orient the movement direction of the unmanned flying object in the predetermined direction in accordance with the rotation angle.

According to the present disclosure, an operator can easily resume the operation of an unmanned flying object.

It should be noted that general or specific embodiments may be implemented as a system, a device, an integrated circuit, a computer program, a computer-readable recording medium, such as compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

<Underlying Knowledge Forming Basis of Present Disclosure>

As conventional techniques, Japanese Unexamined Patent Application Publication No. 8-10451 discloses techniques of preventing a crash by causing a helicopter to hover if an operator encounters an accident, such as falling down, while operating the helicopter, which is an unmanned flying object.

Although the above-described conventional techniques may prevent a crash, the attitude, in particular, the orientation of the unmanned flying object is uncontrolled. Accordingly, when the unmanned flying object is positioned at a distant point, where visual recognition of the unmanned flying object is difficult, the attitude, in particular, the orientation of the unmanned flying object is difficult to determine. In this case, it is difficult for the operator to recover the operation since the operator fails to determine the orientation of the unmanned flying object to be operated.

That is, although in Japanese Unexamined Patent Application Publication No. 8-10451, the unmanned flying object hovers and remains stationary in the air, the direction in which the forward direction thereof is oriented is unclear and when the unmanned flying object is present far away and the visual recognition is difficult, it is difficult for the operator to find the forward direction of the unmanned flying object and there is a problem in recovering the operation.

Thus, in the present disclosure, in order to safely recover the control of the unmanned flying object at a distant point and in a situation where visual recognition is difficult, including an accident on the operator, the attitude of the unmanned flying object is compulsorily controlled into an orientation predetermined for the view from the operator.

For example, the unmanned flying object according to the present disclosure includes a position acquisition unit for grasping the position of the unmanned flying object. To control the unmanned flying object, the operation device that the operator holds also includes a position acquisition unit for sensing the position of the operation device. The operation device further includes a position reset switch for entrance to operations for resetting the position of the unmanned flying object.

When the operator presses the position reset switch, the operation device communicates with the unmanned flying object and the unmanned flying object acquires positional information on the operation device to control the attitude of the unmanned flying object and hovers by turning in the direction of the operation device. Since here the position of the operator and the position of the operation device can be estimated to be approximately the same positions, the unmanned flying object can be controlled so as to be oriented toward the operator and remain stationary.

As described above, when the operator presses the predetermined switch, the position of the operation device that the operator holds is acquired and the unmanned flying object is controlled so as to take the attitude in which the unmanned flying object is oriented in the direction of the operation device and hovers, and accordingly, the attitude of the unmanned flying object can be compulsorily controlled into the orientation that is predetermined for the view from the operator and the unmanned flying object can be easily oriented in the direction of the operator (the direction of the operation device) to be stationary.

In this manner, when the operator presses the predetermined switch, the unmanned flying object is caused to hover for a time and the orientation of the unmanned flying object is caused to be in the direction of the operator. Thus, the operation of the unmanned flying object can be easily recovered. As a result, the possibility of a crash or a flyaway (an uncontrolled state) of the unmanned flying object can be decreased.

The unmanned flying object detects the position of the unmanned flying object using the position acquisition unit that is included in the unmanned flying object to acquire the position of the unmanned flying object, such as a positioning system like the global positioning system (GPS) or the global navigation satellite system (GLONASS). The unmanned flying object further includes a compass and is configured so as to be capable of detecting the orientation of the body of the unmanned flying object. While the operator holds the operation device, the operation device also includes the position acquisition unit for the position of the operation device, which is similar to the above-described position acquisition unit.

Such a configuration enables coordinates (X1, Y1) of the position of the operation device, which can be estimated to be approximately equal to the position of the operator, and coordinates (X2, Y2), which indicate the position of the flying object to be obtained. Since the operation device and the unmanned flying object include respective wireless communication units and can exchange information with each other, the unmanned flying object can acquire the two pairs of coordinates (X1, Y1) and (X2, Y2).

In this case, a rotation angle θ for orienting the unmanned flying object in the direction in which the operation device is positioned is acquired by performing transformation into polar coordinates, where the two pieces of information on the longitudes and latitudes are regarded as rectangular coordinates and the position of the unmanned flying object serves as the origin point.

That is, the rotation angle θ can be determined by the equation, tan θ=X/Y when X=X1-X2 and Y=Y1-Y2.

The unmanned flying object uses the acquired rotation angle θ to change the attitude and is controlled so that the front of the body is oriented in the direction of the rotation angle θ.

Such a configuration enables the operator to orient the movement direction (for example, the forward direction) of the unmanned flying object in the direction of the operator by pressing a predetermined command button, such as the position reset switch of the operation device. That is, even when the unmanned flying object is flying at a distant location, where visual recognition is difficult, the operator can easily determine the attitude (the orientation) of the unmanned flying object and easily recover the control thereof.

According to the above-described flight control method of the unmanned flying object, even when for example, the operator loses track of the unmanned flying object or loses control of the unmanned flying object, the operation of the unmanned flying object can be easily recovered by causing the unmanned flying object to hover for a time and further causing the orientation of the unmanned flying object to be in the direction of the operator.

Thus, the possibility of a crash or a flyaway (the uncontrolled state) of the unmanned flying object can be decreased.

The present disclosure may be summarized as follows from each description above and the descriptions of the embodiments below. That is, an unmanned flying object according to an aspect of the present disclosure includes, a position sensor that acquires first positional information indicating a position of the unmanned flying object, a wireless communicator that receives second positional information indicating a position of an operation device from the operation device used to operate the unmanned flying object, and circuitry that, in operation, when the wireless communicator receives a position reset command from the operation device, determines a rotation angle needed to orient a movement direction of the unmanned flying object in a predetermined direction in accordance with the first positional information and the second positional information; and performs control to orient the movement direction of the unmanned flying object in the predetermined direction in accordance with the rotation angle.

Since through such a configuration, a position reset command and the position of the operation device are received from the operation device and the rotation angle for orienting the movement direction of the unmanned flying object in a predetermined direction is determined in accordance with the position of the operation device and the position of the unmanned flying object to control the unmanned flying object in accordance with the rotation angle, the movement direction of the unmanned flying object can be oriented in the predetermined direction. As a result, even when the visual recognition of the unmanned flying object is impossible, the operator can grasp the direction in which the movement direction of the unmanned flying object is oriented and easily resume the operation of the unmanned flying object.

The movement direction may be a forward direction of the unmanned flying object.

Since through such a configuration, the rotation angle for orienting the forward direction of the unmanned flying object in the predetermined direction is determined in accordance with the position of the operation device and the position of the unmanned flying object, the forward direction of the unmanned flying object can be oriented in the predetermined direction, and even when the visual recognition of the unmanned flying object is impossible, the operator can grasp the direction in which the forward direction of the unmanned flying object is oriented.

The predetermined direction may be a direction in which the operation device is positioned.

Such a configuration enables the movement direction of the unmanned flying object to be oriented in the direction in which the operation device is positioned, that is, the direction in which the operator is positioned, and even when the visual recognition of the unmanned flying object is impossible, the operator can grasp that the movement direction of the unmanned flying object is oriented in the direction in which the operator is positioned.

When θ represents the rotation angle, (X1, Y1) represents the position of the operation device, and (X2, Y2) represents the position of the unmanned flying object and when X=X1-X2 and Y=Y1-Y2, the circuitry may determine the rotation angle θ using an equation, θ=arctan (X/Y).

Such a configuration enables the movement direction of the unmanned flying object to be properly oriented in the direction in which the operation device is positioned, that is, the direction in which the operator is positioned, and even when the visual recognition of the unmanned flying object is impossible, the operator can grasp that the movement direction of the unmanned flying object is properly oriented in the direction in which the operator is positioned.

In accordance with the rotation angle, the circuitry may control the unmanned flying object so that the movement direction of the unmanned flying object is oriented in the predetermined direction and the unmanned flying object hovers at a predetermined altitude.

Since through such a configuration, the movement direction of the unmanned flying object is oriented in the predetermined direction in accordance with the rotation angle, the operator can grasp the direction in which the movement direction of the unmanned flying object is oriented and since the unmanned flying object hovers at a predetermined altitude, the unmanned flying object can be put on standby so as to be able to accept the resumption of the operation and even when the visual recognition of the unmanned flying object is impossible, the operator can resume the operation of the unmanned flying object more easily.

The present disclosure may be implemented not only as an unmanned flying object with the above-described distinctive configuration but may also be implemented as a flight control method of the unmanned flying object that performs a distinctive process corresponding to the distinctive configuration of the unmanned flying object. Thus, another aspect, which is described below, can bring advantages similar to those by the above-described unmanned flying object.

A flight control method of an unmanned flying object according to another aspect of the present disclosure includes acquiring first positional information indicating a position of the unmanned flying object using a position sensor, receiving a position reset command and second positional information that indicates a position of an operation device from the operation device used to operate the unmanned flying object, determining a rotation angle needed to orient a movement direction of the unmanned flying object in a predetermined direction in accordance with the first positional information and the second positional information, and performing control to orient the movement direction of the unmanned flying object in the predetermined direction in accordance with the rotation angle.

All the embodiments described below present specific examples of the present disclosure. The values, shapes, constituents, steps, sequence of the steps, and the like that are indicated below in the embodiments are examples and are not intended to limit the present disclosure. Among the constituents of the embodiment below, the constituents not recited in the independent aspects of the present disclosure, which represent the most superordinate concepts, are explained as given constituents. In all embodiments, contents thereof may be combined.

EMBODIMENT

An embodiment of the present disclosure is described below with reference to the drawings.

A flight control method according to the present embodiment controls an unmanned flying object so that the unmanned flying object takes the attitude in which the forward direction of the unmanned flying object is oriented in the direction of an operation device and hovers by pressing a position reset switch provided with the operation device. Herein, such operations are described in detail below with reference to the drawings.

Figure 1:
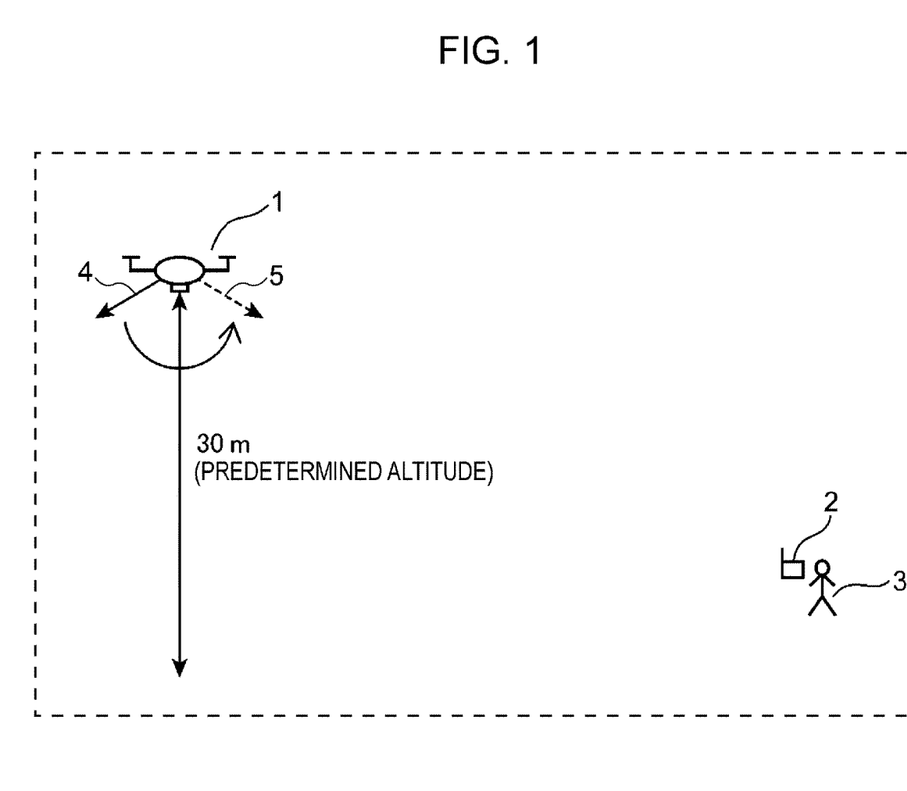
FIG. 1 is a schematic diagram for describing the positional relation between an unmanned flying object and an operation device according to an embodiment of the present disclosure.
Figure 2:
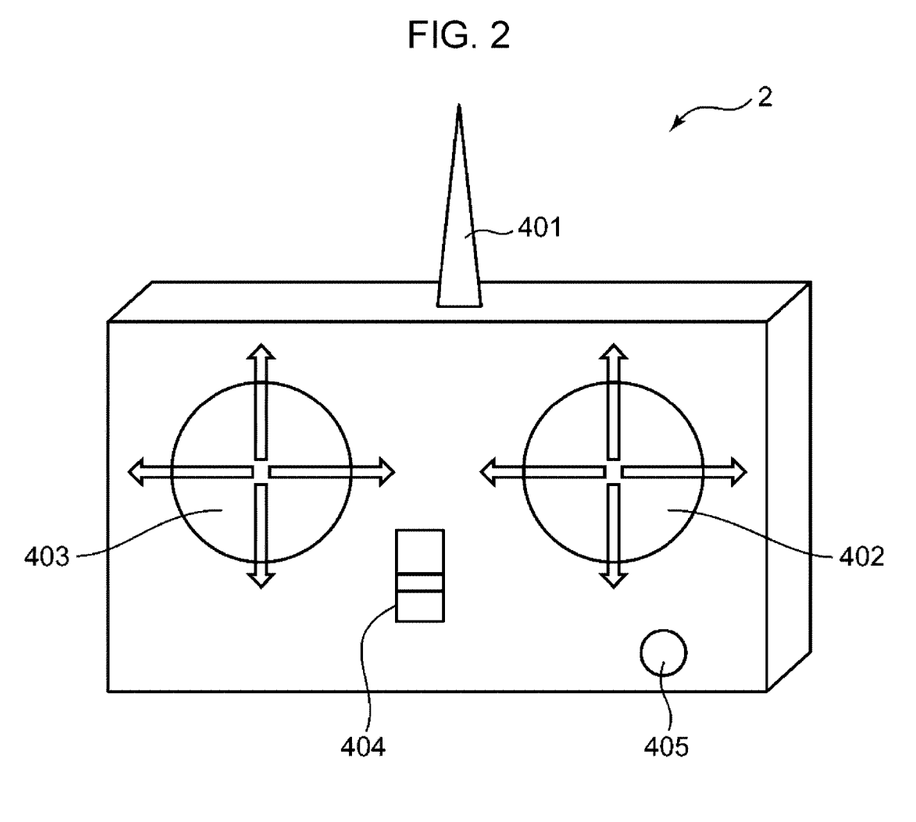
FIG. 2 illustrates an example of the external appearance of the operation device, which includes a position reset switch according to the embodiment of the present disclosure.

FIG. 1 is a schematic diagram for describing the positional relation between an unmanned flying object 1 and an operation device 2 according to the present embodiment. FIG. 2 illustrates an example of the external appearance of the operation device 2 according to the present embodiment.

FIG. 1 illustrates the positional relation among the unmanned flying object 1, the operation device 2, and an operator 3. The unmanned flying object 1 illustrated in FIG. 1 is operated using the operation device 2 and the operator 3 remotely operates the unmanned flying object 1 using the operation device 2. The forward direction of the unmanned flying object 1 before a position reset operation of the unmanned flying object 1 is indicated as the direction of arrow 4 and the forward direction after the position reset operation of the unmanned flying object 1 is indicated as the direction of arrow 5, and the direction 5 after the position reset operation is oriented in the direction of the operation device 2, that is, the direction of the operator 3.

As illustrated in FIG. 2, the operation device 2 includes an antenna 401, a right stick 402, a left stick 403, a main power switch 404, and a position reset switch 405.

The antenna 401 is used for communication with the unmanned flying object 1. The right stick 402 and the left stick 403 accept input of the operator 3. The right stick 402 and the left stick 403 are both movable upward, downward, leftward, and rightward. The main power switch 404 is a switch for turning on or off the main power supply. The position reset switch 405 is a switch for resetting the position of the unmanned flying object 1.

The cross-like arrows of the right stick 402 and the left stick 403 are each caused to correspond to the movement direction of the unmanned flying object 1, such as the forward direction, the backward direction, the rightward direction, or the leftward direction. For example, when the upward arrow is caused to correspond to the forward direction of the unmanned flying object 1, and when the operator 3 tilts the right stick 402 or the left stick 403 in the upward direction, the unmanned flying object 1 moves in the forward direction.

When the operator 3 presses the position reset switch 405, as illustrated in FIG. 1, hovering that stops the unmanned flying object 1 at a predetermined altitude, for example, the ground clearance of 30 m is started and the orientation of the unmanned flying object 1, specifically, the forward direction of the unmanned flying object 1 is caused to be in the direction in which the operator 3 is positioned. Since the unmanned flying object 1 is incapable of grasping the position of the operator 3 in actuality, on the assumption that the position of the operation device 2 equals the position of the operator 3, the unmanned flying object 1 orients the forward direction of the unmanned flying object 1 toward the position and hovers. Accordingly, the operator 3 can instruct the unmanned flying object 1 to move forward by operating the right stick 402 or the left stick 403 of the operation device 2 and thus, the unmanned flying object 1 can be configured so that the unmanned flying object 1 can return toward the operator 3.

Figure 3:
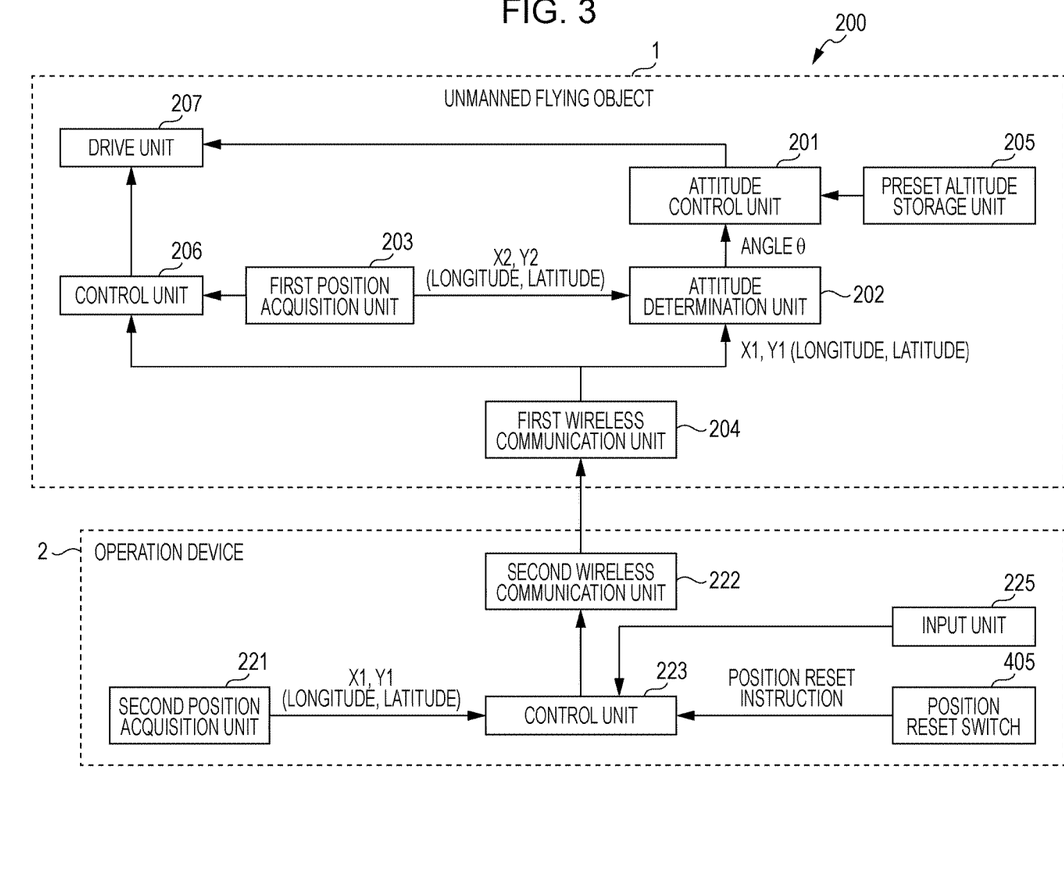
FIG. 3 is a block diagram illustrating an example of the configuration of a flight control system, which includes the unmanned flying object and the operation device according to the embodiment of the present disclosure.
Figure 4:
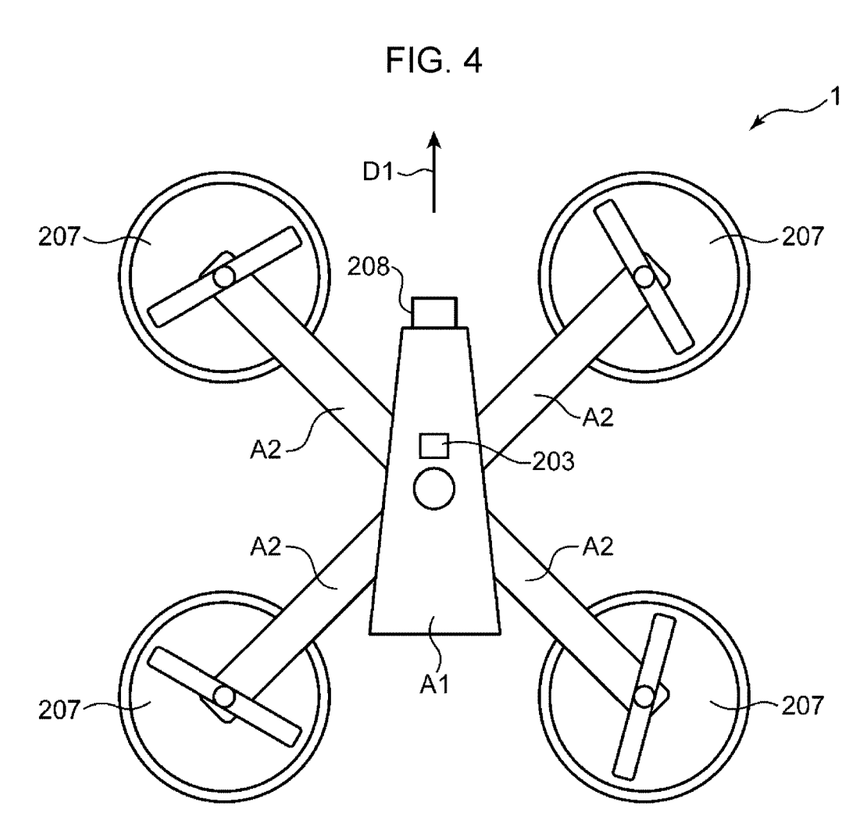
FIG. 4 illustrates an example of the external appearance of the unmanned flying object according to the embodiment of the present disclosure.

FIG. 3 is a block diagram illustrating an example of the configuration of a flight control system 200, which includes the unmanned flying object 1 and the operation device 2 according to the present embodiment, and FIG. 4 illustrates an example of the external appearance of the unmanned flying object 1 according to the present embodiment.

As illustrated in FIG. 3, the flight control system 200 includes the unmanned flying object 1 and the operation device 2, which can be mutually coupled through wireless communication. The operation device 2 includes a second position acquisition unit 221, a second wireless communication unit 222, a control unit 223, a position reset switch 405, and an input unit 225. The control unit 223 controls the second position acquisition unit 221, the second wireless communication unit 222, the position reset switch 405, and the input unit 225.

The second position acquisition unit 221 acquires positional information that indicates the position of the operation device 2, which is for example, information on the longitude and latitude. The second position acquisition unit 221 is a sensor that uses a positional information system, such as the GPS or GLONASS. The second wireless communication unit 222 utilizes wireless communication to communicate with the unmanned flying object 1, and transmits and receives information. The wireless communication scheme that the second wireless communication unit 222 uses may be a wireless local area network (LAN), such as Wi-Fi, may be wireless communication in a band of 2.4 GHz, which is used in radio control or the like, or may be optical communication, such as infrared communication.

The input unit 225 is made up of the right stick 402 and the left stick 403 illustrated in FIG. 2 and accepts an instruction input for the unmanned flying object 1 by the operator 3. As exemplified in FIG. 2, the position reset switch 405 is a switch provided in a lower portion on the right side of the operation face of the operation device 2 and the operator 3 can press the position reset switch 405 when the operator 3 determines that the control of the unmanned flying object 1 is difficult. Specifically, when the operator 3 presses (turns on) the position reset switch 405, the unmanned flying object 1 starts the position reset operation.

When through the above-described operations, the position reset switch 405 senses that the position reset switch 405 is turned on, the position reset switch 405 notifies the position reset instruction to the control unit 223. When the position reset switch 405 is pressed, the control unit 223 receives the reset instruction and performs control for transmitting a position reset command to instruct that the position reset operation be started and the positional information on the operation device 2, which is acquired by the second position acquisition unit 221, to the unmanned flying object 1 through the second wireless communication unit 222.

As illustrated in FIG. 4, the unmanned flying object 1 includes a main body A1, four support units A2, four drive units 207, which cause driving force of the unmanned flying object 1, and a camera 208 for taking a photograph. The drive units 207 are attached to top end portions of the respective support units A2, which extend from the main body A1 in four directions. The first position acquisition unit 203 is attached on the upper side of the main body A1.

Inside the main body A1, an attitude control unit 201, an attitude determination unit 202, a first wireless communication unit 204, a preset altitude storage unit 205, and a control unit 206, which are illustrated in FIG. 3, are accommodated. The camera 208 is attached to a top end portion of the main body A1. The camera 208 is a photographing unit that photographs a subject at a forward position or a forward lower position, and can photograph a subject in a photographing direction D1. For example, regarding the unmanned flying object 1 illustrated in FIG. 4, the photographing direction D1 of the camera 208 is set in the forward direction of the unmanned flying object 1, and when the operator 3 tilts the right stick 402 or the left stick 403 in the upward direction, the unmanned flying object 1 moves in the photographing direction D1 (the forward direction of the unmanned flying object 1).

As can be seen in FIG. 3, the control unit 206 controls the flight of the unmanned flying object 1. The drive unit 207 is made up of a propeller and a motor that rotates the propeller. The control unit 206 controls the movement direction or the flight state of the unmanned flying object 1 by suitably controlling the number of revolutions of the propeller of the drive unit 207. Although in FIG. 4, the unmanned flying object 1 includes four drive units as the drive units 207, the number is not limited to four and for example, five or more drive units may be used.

The first position acquisition unit 203 is included in the unmanned flying object 1 and has a function of acquiring positional information that indicates the position of the unmanned flying object 1, such as information on the longitude and latitude. The first position acquisition unit 203 is a sensor that uses a positional information system, such as the GPS or GLONASS.

The first wireless communication unit 204 communicates with the operation device 2 using wireless communication to transmit and receive information. The first wireless communication unit 204 receives an operational instruction from the operation device 2. The wireless communication scheme that the first wireless communication unit 204 uses may be a wireless local area network (LAN), such as Wi-Fi, or may be wireless communication in a band of 2.4 GHz, which is used in radio control or the like, or may be optical communication, such as infrared communication.

In the present embodiment, the first wireless communication unit 204 and the second wireless communication unit 222 each have a function of performing transmission and reception of a command for controlling the unmanned flying object 1 by radio between the unmanned flying object 1 and the operation device 2. When the position reset switch 405 is pressed, wireless communication is utilized to transmit the position reset command for instructing that the position reset operation be started from the operation device 2 to the unmanned flying object 1. For another example, wireless communication may be utilized to transmit the positional information on the operation device 2 to the unmanned flying object 1.

The preset altitude storage unit 205 is memory in which a predetermined altitude at the position reset time is stored. The information that indicates the altitude may be expressed as the altitude above sea level or the ground clearance as long as the information enables the altitude suitable for hovering to be converted into a number and stored. In the present example, the ground clearance is 30 m.

The attitude determination unit 202 has a function for determining the rotation angle needed to orient the movement direction of the unmanned flying object 1, such as the forward direction, toward the operation device 2 using the respective pieces of positional information on the unmanned flying object 1 and the operation device 2 acquired by the first position acquisition unit 203 and the second position acquisition unit 221. The attitude determination unit 202 determines the rotation angle θ for orienting the movement direction of the unmanned flying object 1, such as the forward direction, in a predetermined direction, such as the direction in which the operation device 2 is positioned in accordance with the position of the operation device 2 and the position of the unmanned flying object 1.

The attitude control unit 201 includes a compass and has a function for controlling the altitude and the traveling direction of the unmanned flying object 1, and controls the flight of the unmanned flying object 1 in accordance with an operational instruction from the operation device 2. Further, the attitude control unit 201 receives parameters indicating the value in the altitude direction and the orientation of the flying object, which are input from the preset altitude storage unit 205 and the attitude determination unit 202, and controls the unmanned flying object 1 in accordance with the rotation angle determined by the attitude determination unit 202.

Here an angle θ on a plane of polar coordinates is used as a parameter. The attitude control unit 201 controls the altitude and the orientation (the attitude) of the unmanned flying object 1 in accordance with the input parameter. For example, the attitude control unit 201 controls the orientation of the unmanned flying object 1 so that the orientation matches the angle θ notified as a parameter.

The position reset switch 405 may be configured as a single switch or a combination of a plurality of switches. The position reset switch 405 may be implemented by using a combination that includes repeating turning on and off a switch of another usage for a predetermined pattern, such as for the number of times predetermined. Further, instead of being a switch that is physically provided on the outside of the operation device 2, the position reset switch 405 may be configured so that a touch panel is provided on the operation device 2 and a button is displayed on the screen of the touch panel to allow the button to be operated by the operator 3.

<Details of Flight Control Process for Resetting Position>

Figure 5:
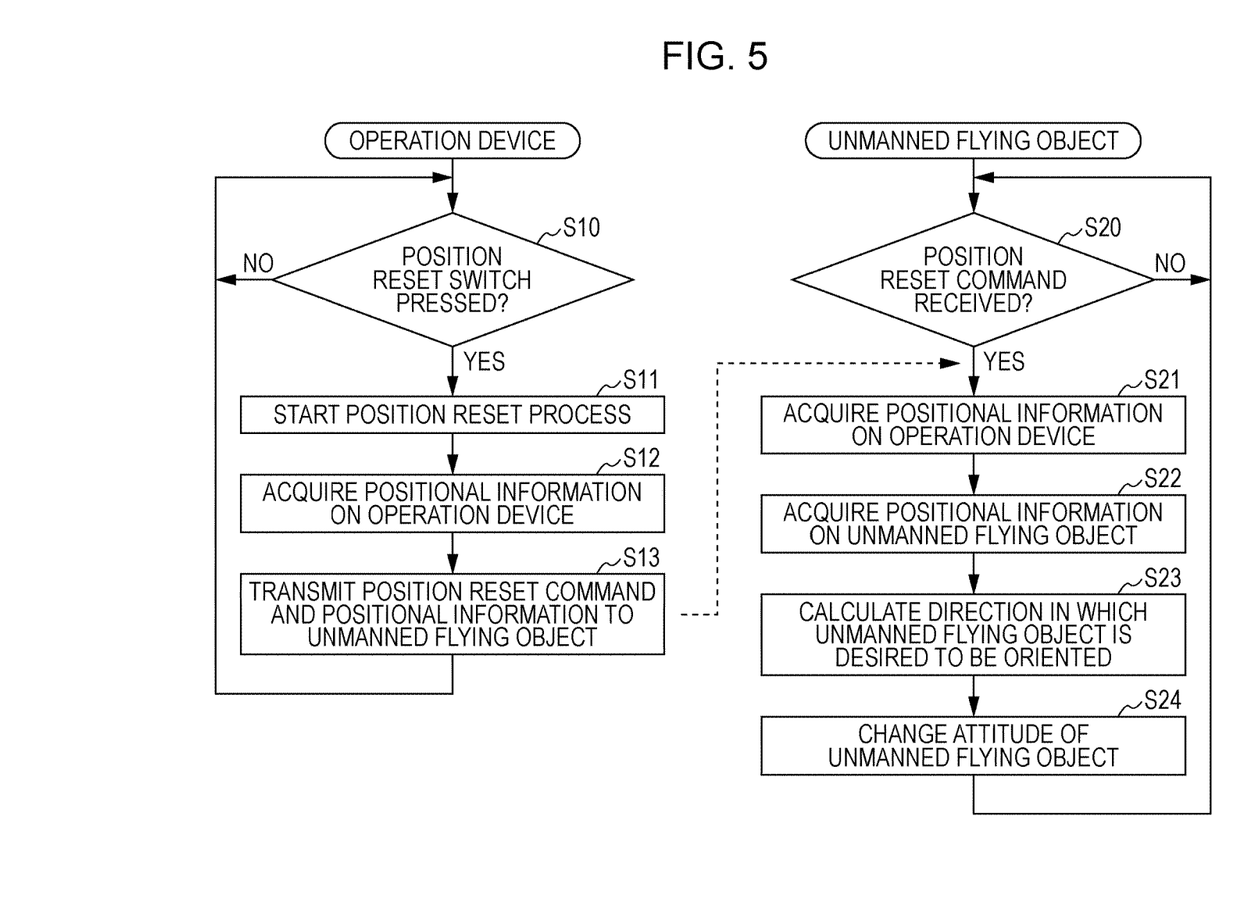
FIG. 5 is a flow chart illustrating an example of flight control operations of the unmanned flying object according to the embodiment of the present disclosure.

Operations of the flight control method of the unmanned flying object 1 according to the present embodiment are described in detail below with reference to the flow chart in FIG. 5.

First, when the operator 3 presses the position reset switch 405 of the operation device 2 (YES in step S10), the position reset switch 405 notifies the control unit 223 of a position reset instruction and the control unit 223 receives the position reset instruction to start a position reset process (step S11).

After that, the control unit 223 receives positional information (X1, Y1) that indicates the position of the operation device 2, such as the longitude and latitude, which is acquired by the second position acquisition unit 221 (step S12).

After that, the control unit 223 transmits the position reset command to instruct that the position reset operations be started and positional information on the operation device 2 (X1, Y1) to the unmanned flying object 1 through the second wireless communication unit 222 (step S13). The position reset command may include the positional information as one of parameters. After the transmission of the position reset command, the positional information may be transmitted as another command.

The attitude determination unit 202 of the unmanned flying object 1 receives the position reset command transmitted by the operation device 2 in step S13 through the first wireless communication unit 204 (YES in step S20). That is, the attitude determination unit 202 receives the position reset command and the position reset operation is started.

After that, the attitude determination unit 202 acquires the positional information (X1, Y1) transmitted by the operation device 2 (step S21).

After that, the attitude determination unit 202 acquires the positional information (X2, Y2) that indicates the position of the unmanned flying object 1, such as the longitude and latitude, from the first position acquisition unit 203 (step S22).

After that, the attitude determination unit 202 calculates the direction in which the unmanned flying object 1 is desired to be oriented using the positional information on the operation device 2 (X1, Y1) and the positional information (X2, Y2) on the unmanned flying object 1 (step S23). Here the direction in which the unmanned flying object 1 is desired to be oriented denotes that the forward direction of the unmanned flying object 1 is oriented toward the operation device 2. Specifically, the attitude determination unit 202 calculates the rotation angle needed to orient the forward direction of the unmanned flying object 1 toward the operation device 2. The attitude determination unit 202 notifies the calculated rotation angle to the attitude control unit 201 as a parameter.

The direction in which the unmanned flying object 1 is desired to be oriented (the movement direction) may denote not only the orientation of the forward direction of the unmanned flying object 1 toward the operation device 2 but may also denote another orientation. That is, various directions can be used as the direction in which the unmanned flying object 1 is desired to be oriented (the movement direction) as long as operating the operation device 2, such as operating the right stick 402 and/or the left stick 403, enables the operator to grasp the direction in which the unmanned flying object 1 moves. For example, the direction may be another direction, such as the backward direction of the unmanned flying object 1 or the rightward or leftward direction in a case where the unmanned flying object 1 is viewed from above, or may be a predetermined direction toward a cardinal point, such as a northward direction, a westward direction, a southward direction, or an eastward direction.

Although in the present embodiment, the photographing direction D1 of the camera 208 equals the forward direction (the movement direction) of the unmanned flying object 1, the direction is not particularly limited to this example and regardless of the presence or absence of the camera 208, various changes are possible, which include causing a specific direction of the unmanned flying object 1, such as the direction of a tapered top end of the main body A1, to equal the forward direction (the movement direction).

After that, the attitude control unit 201 controls the drive units 207 in accordance with the parameter notified from the attitude determination unit 202 to change the attitude of the unmanned flying object 1 (step S24). Specifically, the unmanned flying object 1 changes the orientation of the unmanned flying object 1 by rotating in accordance with the rotation angle notified as a parameter. As a result, the unmanned flying object 1 can orient the forward direction in the direction of the operator 3 and hover.

As described above, the attitude determination unit 202 acquires the coordinates (X1, Y1) of the position of the operation device 2, which can be estimated to be approximately equal to the position of the operator 3, and the coordinates (X2, Y2) that indicate the position of the unmanned flying object 1. The attitude determination unit 202 performs calculation as described below using the acquired two pairs of coordinates (X1, Y1) and (X2, Y2).

Figure 6:
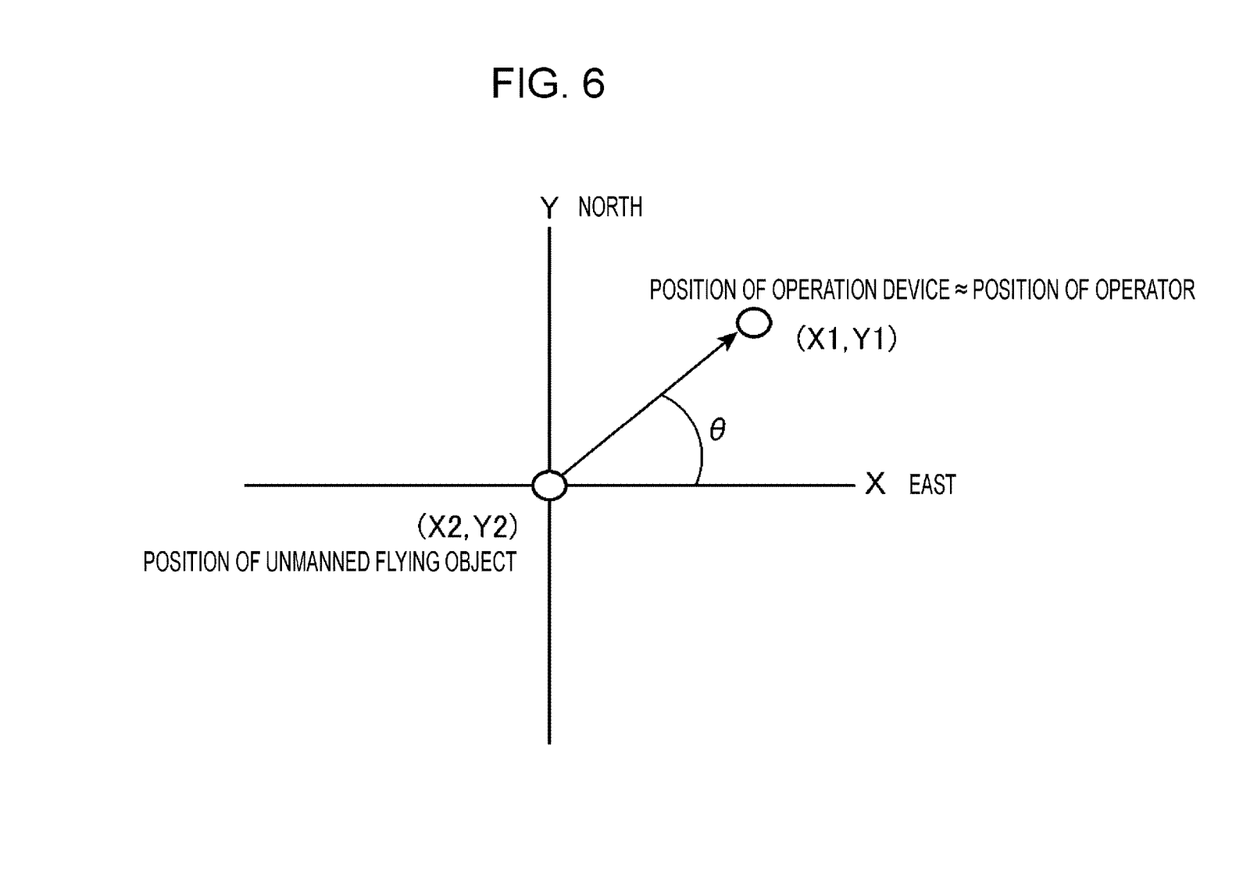
FIG. 6 illustrates an example of a procedure of determining the position of the unmanned flying object according to the embodiment of the present disclosure.

These relations are illustrated in FIG. 6.

First, transformation into the polar coordinates is performed, where the two pieces of information on the longitudes and latitudes are regarded as rectangular coordinates and the position of the unmanned flying object 1 serves as the origin point. Thus, the rotation angle θ for orienting the unmanned flying object 1 in the direction in which the operation device 2 is positioned is acquired.

That is, the relation of the equation, tan θ=X/Y holds when X=X1-X2 and Y=Y1-Y2. Thus, solving the equation enables the rotation angle θ that is necessary to be acquired since θ=arctan (X/Y). Here "arctan" denotes a function for determining arctangent.

The attitude determination unit 202 notifies the rotation angle θ determined through the calculation to the attitude control unit 201. The unmanned flying object 1 performs necessary rotation based on the notified rotation angle θ and as a result, can orient the forward direction in the direction of the operator 3 and hover. The method of determining the rotation angle is not particularly limited to the above-described example and the rotation angle may be calculated using positional information other than the longitude and latitude, and various changes are possible.

When the preset altitude storage unit 205 stores a preset altitude for the position resetting, which is set in advance, the attitude control unit 201 receives the rotation angle θ from the attitude determination unit 202 and also receives the altitude as a parameter from the preset altitude storage unit 205, and controls the altitude of the unmanned flying object 1 as well.

As described above, when the operator 3 turns on the position reset switch 405 of the operation device 2, which is close to a hand of the operator 3, even if the unmanned flying object 1 enters the uncontrolled state, the unmanned flying object 1 can remain stationary (hover) at a predetermined altitude by orienting the forward direction of the unmanned flying object 1 toward the position of the operation device 2, that is, the position of the operator 3. That is, even when the unmanned flying object 1 is flying at a distant location, where visual recognition is difficult, the operator 3 can easily determine the attitude (the orientation) of the unmanned flying object 1 and easily recover the controlled state thereof.

Thus, the operator 3 can control the unmanned flying object 1 so that the unmanned flying object 1 returns toward a hand of the operator 3 simply by transmitting an instruction regarding the forward movement to the unmanned flying object 1 and accordingly, the operation can be recovered easily and this is very useful in collecting equipment.

As described above, according to the flight control method of the unmanned flying object 1 of the present embodiment, even when for example, the operator loses track of the unmanned flying object 1 or loses control of the unmanned flying object 1, the operation of the unmanned flying object 1 can be easily recovered by causing the unmanned flying object 1 to hover for a time and further causing the orientation of the unmanned flying object 1 to be in the direction of the operator.

Thus, the possibility of a crash or a flyaway (the uncontrolled state) of the unmanned flying object 1 can be decreased.

The flight control method of the unmanned flying object according to the present disclosure is useful for an unmanned flying object that uses a position reset switch and has a function of hovering by directing the orientation of the unmanned flying object toward the position of the operation device when the position reset switch is pressed, and is controlled by an operator remotely.

What is claimed is:

1. An unmanned flying object comprising:
a position sensor that acquires first positional information indicating a position of the unmanned flying object;
a wireless communicator that receives, from an operation device that operates the unmanned flying object, second positional information indicating a position of the operation device; and
circuitry that, in operation,
when the wireless communicator receives a position reset command from the operation device, determines a rotation angle, with respect to a horizontal, needed to orient a movement direction of the unmanned flying object in a predetermined direction in accordance with the first positional information and the second positional information, and
performs control to orient the movement direction of the unmanned flying object in the predetermined direction in accordance with the rotation angle.

2. The unmanned flying object according to claim 1, wherein
the movement direction is a forward direction of the unmanned flying object.

3. The unmanned flying object according to claim 1, wherein
the predetermined direction is a direction in which the operation device is positioned.

4. The unmanned flying object according to claim 1, wherein
when θ represents the rotation angle, (X1, Y1) represents the position of the operation device, and (X2, Y2) represents the position of the unmanned flying object and when X=X1−X2 and Y=Y1−Y2, the circuitry determines the rotation angle θ using an equation, θ=arctan (X/Y).

5. The unmanned flying object according to claim 1, wherein
in accordance with the rotation angle, the circuitry controls the unmanned flying object so that the movement direction of the unmanned flying object is oriented in the predetermined direction and the unmanned flying object hovers at a predetermined altitude.

6. The unmanned flying object according to claim 1, wherein the position reset command is output by a switch on the operation device, the switch being operated when control of the unmanned flying object has become difficult.

7. The unmanned flying object according to claim 1, the second positional information comprises a sensor that uses a positional information system.

8. The unmanned flying object according to claim 1, wherein the predetermined direction is a direction in which a forward direction of the unmanned flying object is oriented towards the operation device.

9. The unmanned flying object according to claim 1, further comprising an imaging device oriented to obtain images in a forward direction of the unmanned flying object.

10. A flight control method of an unmanned flying object, the method comprising:
acquiring first positional information indicating a position of the unmanned flying object using a position sensor;
receiving a position reset command and second positional information from an operation device that operates the unmanned flying object, the second positional information indicating a position of the operation device;

determining a rotation angle, with respect to a horizontal, needed to orient a movement direction of the unmanned flying object in a predetermined direction in accordance with the first positional information and the second positional information; and performing control to orient the movement direction of the unmanned flying object in the predetermined direction in accordance with the rotation angle.

11. The flight control method according to claim 10, wherein the performing control comprises controlling the unmanned flying object in accordance with the rotation angle so that the movement direction of the unmanned flying object is oriented in a predetermined direction and the unmanned flying object hovers at a predetermined altitude.

12. The flight control method according to claim 10, wherein the position reset command is output in response to a determination that control of the unmanned flying object has become difficult.

13. The flight control method according to claim 10, the second positional information being determined based on a positional information system.

14. The flight control method according to claim 10, wherein the predetermined direction is a direction in which a forward direction of the unmanned flying object is oriented towards the operation device.

15. The flight control method according to claim 10, further comprising orienting an imaging device to obtain images in a forward direction of the unmanned flying object.

* * * * *